(12) United States Patent
Yap

(10) Patent No.: US 8,882,124 B2
(45) Date of Patent: Nov. 11, 2014

(54) FOLDABLE BICYCLE

(71) Applicant: Fook Fah Yap, Singapore (SG)

(72) Inventor: Fook Fah Yap, Singapore (SG)

(*) Notice: Subject to any disclaimer, the term of this patent is extended or adjusted under 35 U.S.C. 154(b) by 0 days.

(21) Appl. No.: 13/889,467

(22) Filed: May 8, 2013

(65) Prior Publication Data

US 2014/0291959 A1 Oct. 2, 2014

Related U.S. Application Data

(60) Provisional application No. 61/806,010, filed on Mar. 28, 2013.

(51) Int. Cl.
*B62K 15/00* (2006.01)

(52) U.S. Cl.
CPC .................... *B62K 15/006* (2013.01)
USPC ........................................ 280/278

(58) Field of Classification Search
CPC ........... B62K 5/00; B62K 5/006; B62K 5/008
USPC ......................................... 280/278, 298, 304
See application file for complete search history.

(56) References Cited

U.S. PATENT DOCUMENTS

| | | | |
|---|---|---|---|
| 5,836,602 A | 11/1998 | Wang | |
| 6,336,649 B1 * | 1/2002 | Lin | 280/278 |
| 6,364,335 B1 | 4/2002 | Mombelli | |
| 6,799,771 B2 | 10/2004 | Bigot | |
| 8,205,902 B2 * | 6/2012 | Uimonen et al. | 280/278 |
| 8,430,414 B1 | 4/2013 | Yap | |
| 2007/0013162 A1 | 1/2007 | Whyte | |
| 2007/0210556 A1 | 9/2007 | Hon et al. | |
| 2011/0025016 A1 * | 2/2011 | Waaijer | 280/287 |

FOREIGN PATENT DOCUMENTS

| | | |
|---|---|---|
| EP | 0026800 B1 | 5/1984 |
| EP | 1600368 A2 | 4/2005 |
| EP | 2492175 A1 | 2/2011 |
| WO | 8605155 A1 | 9/1986 |
| WO | 2004041631 A1 | 5/2004 |

OTHER PUBLICATIONS

Dahonbikes Website, May 8, 2013.
Pacific Cycles Website, May 8, 2013.
Birdy Bike Website, Jul. 24, 2013: http://www.birdybike.com.
Bickerton Website, Jul. 24, 2013: http://www.bickertonportables.co.uk.

* cited by examiner

*Primary Examiner* — Joseph M Rocca
*Assistant Examiner* — Felicia L Brittman
(74) *Attorney, Agent, or Firm* — MP Patents, LLC

(57) ABSTRACT

A vehicle is configured for conversion between an expanded arrangement in which forward and rearward portions of a main frame member are coincident and a folded arrangement in which the forward and rearward portions are non-coincident. A hinge coupling enables relative pivoting of forward and rearward portions about a main frame pivot axis extending at acute angles relative to both a rear vertical transverse plane and a horizontal plane. A method of providing the vehicle in a folded arrangement includes configuring an elongate main frame member such that longitudinal axes of forward and rearward portions of the main frame member are non-coincidental, configuring a steering tube such that a longitudinal axis of a proximal portion of the steering tube lies within a plane parallel to and spaced apart from the front longitudinal plane while a distal portion lies within the vertical longitudinal plane.

21 Claims, 10 Drawing Sheets

FOLDABLE BICYCLE

CROSS REFERENCE TO RELATED APPLICATIONS

This application claims the priority benefit of U.S. Provisional Application No. 61/806,010 filed on Mar. 28, 2013 which is incorporated herein by reference in its entirety.

BACKGROUND

The present disclosure relates generally to wheeled vehicles. More particularly, the present disclosure is related to embodiments of an apparatus providing wheeled vehicles such as bicycles capable of assuming a reduced size for transport. Currently, vehicles are not capable of quickly folding into a small footprint.

SUMMARY

A vehicle configured for conversion between expanded and folded arrangements, includes a front wheel having a circumference defining a front vertical longitudinal plane and an axle defining a front vertical transverse plane orthogonal to the front vertical longitudinal plane; a rear wheel having a circumference defining a rear vertical longitudinal plane and an axle defining a rear vertical transverse plane orthogonal to the rear vertical longitudinal plane; a main frame member having forward and rearward portions extending between the front wheel and the rear wheel and including, for receiving a steering tube, a head tube formed at a distal end of the forward portion and, for receiving a seat post, a seat tube formed at a distal end of the rearward portion; and a hinge coupling enabling relative pivoting of the forward and rearward portions about a main frame pivot axis extending at an acute angle relative to the rear vertical transverse plane and at an acute angle relative to a horizontal plane orthogonal to both the rear vertical longitudinal and rear vertical transverse planes; and wherein longitudinal axes of the forward and rearward portions are coincident in the expanded arrangement and non-coincident in the folded arrangement.

DETAILED DESCRIPTION

Non-folding bicycles are generally too large to conveniently fit on buses and trains. Known folding bicycles occupy relatively large footprints in their folded configuration due to a number of factors. Generally, folded arrangements place two wheels side-by-side with aligned axles so that the minimum footprint width is limited by the sum of the length of the wheel axles. Also, the plane of the front wheel is inclined at an angle relative to the plane of the rear wheel, which contributes to an increased footprint width. Further, because previous folded bicycles are not self-supporting in an upright position and may only be parked in a horizontal position on the floor, they occupy a larger footprint.

An advantageous folding bicycle occupies a relatively small footprint, is capable of rolling in the folded arrangement, may be folded according to a quick and intuitive process, includes a small number of hinges and joints, is easily manufactured from standard parts and, in the expanded arrangement, is of a size comparable to a traditional, non-folding bicycle.

A bicycle in accordance with the present disclosure may be quickly folded into a compact, self-supporting, rollable package with a small footprint to thereby facilitate transport on trains, rapid transit systems, buses, or allow for storage in tight spaces. Folding is intuitive and can be performed quickly with the aid of gravity.

In the folded arrangement, the bicycle may be easily rolled by a walking adult with one hand in a manner similar to rolling luggage or a folded baby stroller and may be parked in a standing position with a small footprint occupying a floor area comparable to that of an average-sized standing adult. Unfolded, the bicycle has geometry and dimensions consistent with a full-sized, conventional bicycle.

It is to be understood that the figures provided are for illustrative purposes only and are not intended to limit the scope of the present disclosure.

Figure 1:
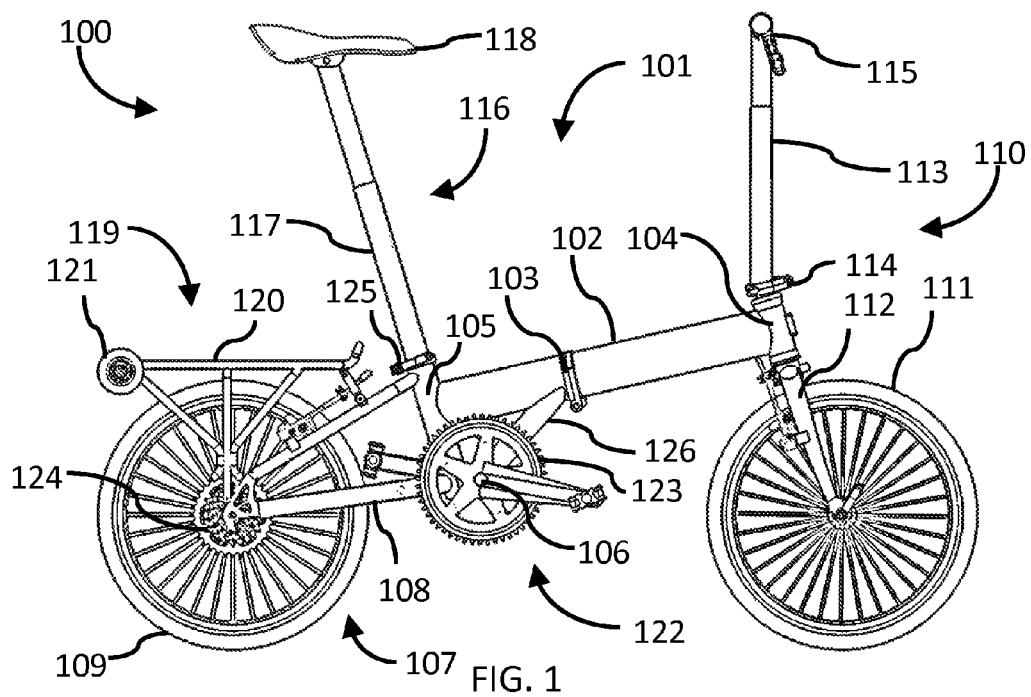
FIG. 1 illustrates a schematic side elevation view of an example bicycle in accordance with the disclosure.
Figure 2:
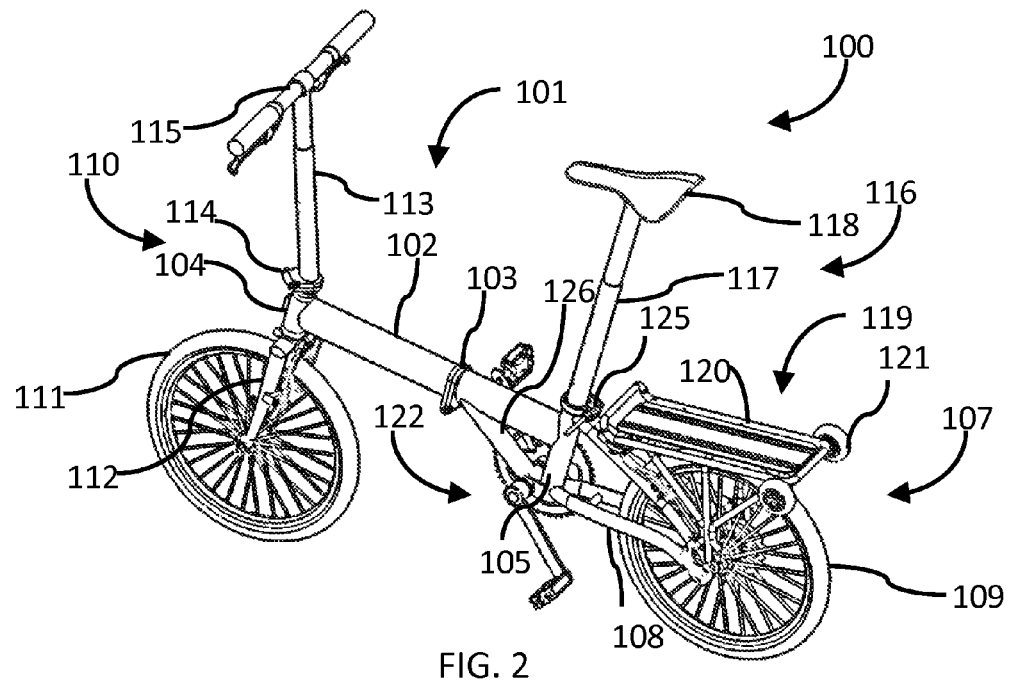
FIG. 2 illustrates a right-side perspective view of the example bicycle of FIG. 1.

A schematic side elevation of an example embodiment of a foldable vehicle in the form of a bicycle 100 is illustrated in FIG. 1. A main frame assembly 101 comprises a main frame member 102 including forward and rearward portions extending substantially from a head tube 104 at the front end to a seat tube 105 at the rear end. Head tube 104 is hollow and open at both ends to enable rotatable coupling with a steering tube (described below). Seat tube 105 extends downwardly between the rearward end of the main frame member 102 and the rearward side of the bottom bracket 106 and is hollow and open at both ends to enable receipt of a seat post such as 117 inserted into seat tube 105 from above.

Main frame assembly 101 may be formed from any of a variety of materials and may take any of a variety of shapes, for example, main frame assembly 101 may be formed as a hollow metal body. The main frame member 102 may be generally straight and linear or may be slightly curved but is generally angled relative to a horizontal plane when resting upright on wheels 109 and 111 in the expanded arrangement.

Figure 9:
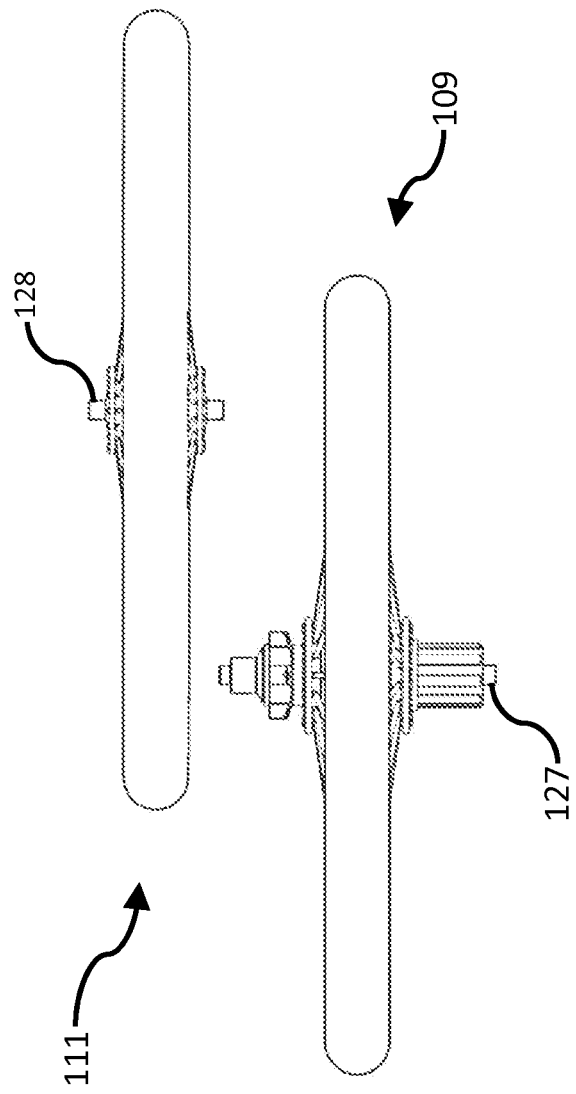
FIG. 9 illustrates a top view of the wheels of the example bicycle of FIGS. 1-8 in a folded arrangement and supported in an upright orientation.

A rear wheel assembly 107 is disposed at the rearward end of the main frame assembly 101 and includes a rear wheel 109 rotatably coupled to carrier 108 at a hub of wheel 109 by way of an axle 127 (FIG. 9). The circumference of rear wheel 109 defines a rear vertical longitudinal plane and rear wheel axle 127 defines a rear vertical transverse plane orthogonal to the rear vertical longitudinal plane. Rear wheel carrier 108 may be formed from any of a variety of materials and take any of a variety of geometries, for example wheel carrier 108 may be formed as a hollow metal body.

A down tube 126 extends from a position proximal to the center of main frame member 102 downwardly and rearwardly to bottom bracket 106 configured to carry crankset 123 which forms part of the bicycle's transmission assembly 122. Bicycle transmission assembly 122 includes crankset 123 rotatably mounted on the bottom bracket 106 and operatively coupled with rear gear sprockets 124 on rear wheel 109 by a chain or a belt (not shown).

Bicycle 100 is configured for conversion between an expanded arrangement in which longitudinal axes of the forward and rearward portions are generally coincident (FIGS. 1, 2, 10 & 11) and a folded arrangement in which the longitudinal axes are generally non-coincident (FIGS. 3-8, 12 & 13). As illustrated by way of example in FIGS. 1, 2, 10 & 11, head tube 104 and seat tube 105 may be slightly rearwardly inclined relative to vertical in the expanded arrangement.

Figure 14:
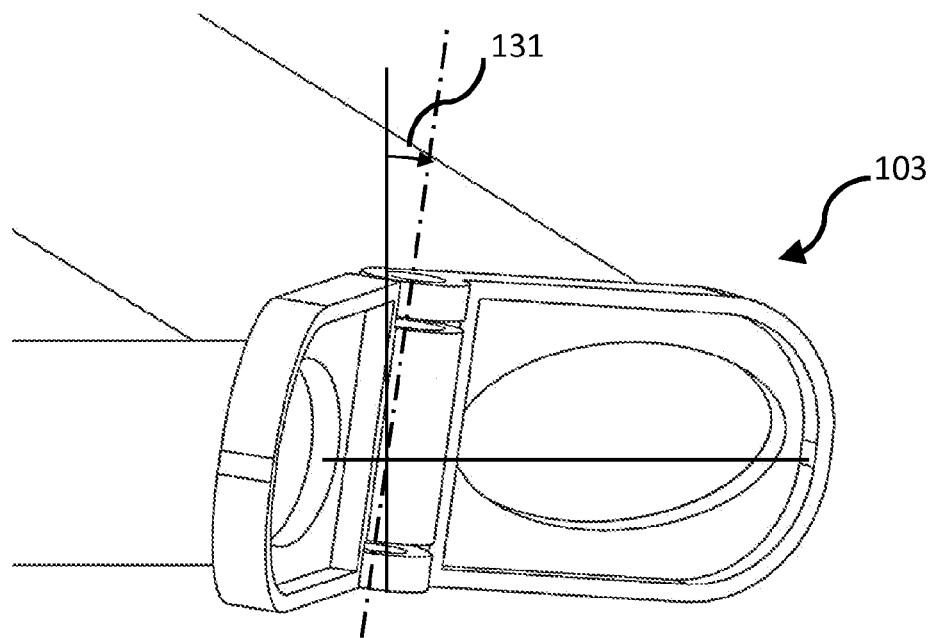
FIG. 14 illustrates a first detail view of the main frame hinge of the example bicycle of FIGS. 1-13.
Figure 15:
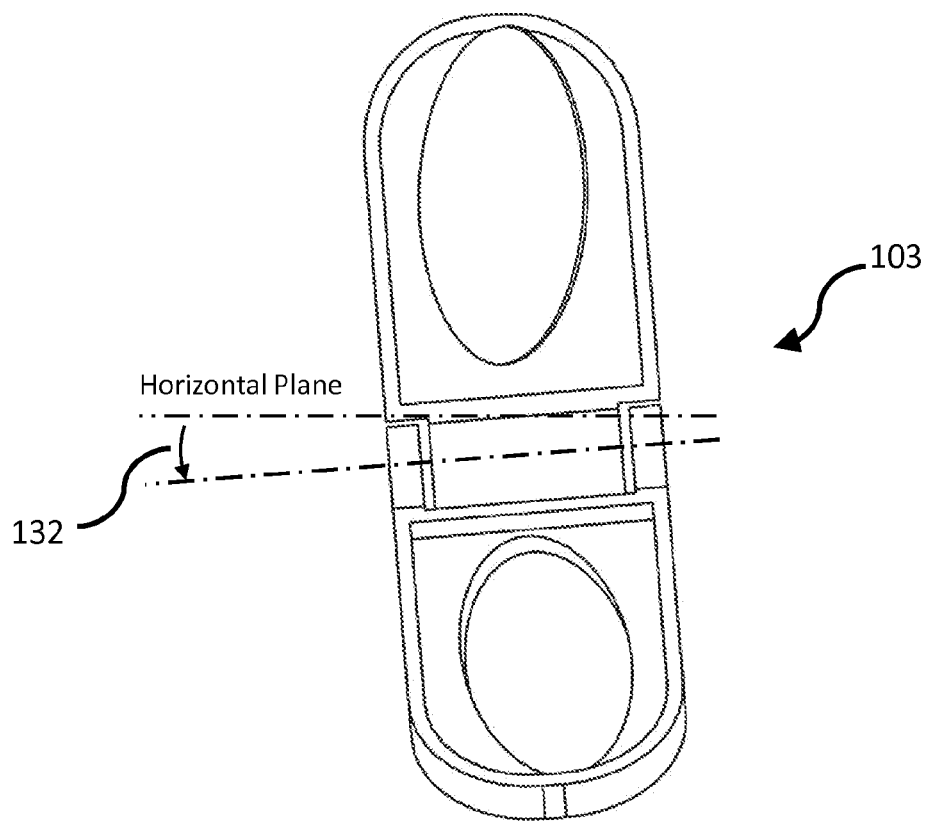
FIG. 15 illustrates a second detail view of the main frame hinge of the example bicycle of FIGS. 1-13.

A hinge coupling 103 is provided on main frame member 102 at a location proximal to the center of main frame member 102 and enables relative pivoting of the forward and rearward portions of main frame member 102 about a main frame pivot axis. The main frame pivot axis extends at an angle 131 relative to the rear vertical transverse plane (FIG. 14) and an angle 132 relative to a horizontal plane (FIG. 15) orthogonal to both the rear vertical longitudinal and rear vertical transverse planes. Furthermore, the midpoint of the main frame pivot axis lies generally below a center of the main frame member cross section.

In some embodiments, angles 131 and 132 may be acute, for example, angle 131 may be approximately 8 degrees, while angle 132 may be approximately 6.5 degrees. Angles different from these may be appropriate depending on width dimensions of various parts of the bicycle and its specific geometry. Front portion of bicycle 100 including head tube 104 and steering assembly 110 is capable of pivoting about the main frame pivot axis through approximately 135 degrees to its folded position.

According to this disposition of the main frame pivot axis, in the expanded arrangement (FIGS. 1, 2, 10 & 11), front wheel 111 is disposed forwardly of the main frame member 102 and lies substantially in the rear vertical longitudinal plane while, in the folded arrangement (FIGS. 3-8, 12 & 13), front wheel 111 is disposed to one side of the rear wheel carrier 108 in a plane parallel to the rear vertical longitudinal plane.

In some embodiments, a locking means may be provided for locking the main frame hinge 103 in the expanded arrangement, in the folded arrangement or either of these. In the expanded arrangement, with hinge 103 locked, pivoting will be prevented and the combined effect of the weight of bicycle 100 and a rider will reinforce maintaining hinge 103 in a closed position as if main frame member 102 were rigid.

Steering assembly 110, disposed at the front end of the main frame assembly 101, includes a front wheel 111, a fork 112, and a steering tube 113 for rotatable coupling to head tube 104. The circumference of front wheel 111 defines a front vertical longitudinal plane and front wheel axle 128 defines a front vertical transverse plane orthogonal to the front vertical longitudinal plane.

Steering tube 113 includes a distal portion configured for receipt by the head tube 104 and a proximal portion including handlebar 115 which extends generally perpendicular to the front vertical longitudinal plane. Rotatable coupling with head tube 104 allows for rotation of steering assembly 110 about the longitudinal axis of head tube 104 to thereby change the angle of the front vertical longitudinal plane to steer bicycle 100.

Figure 16:
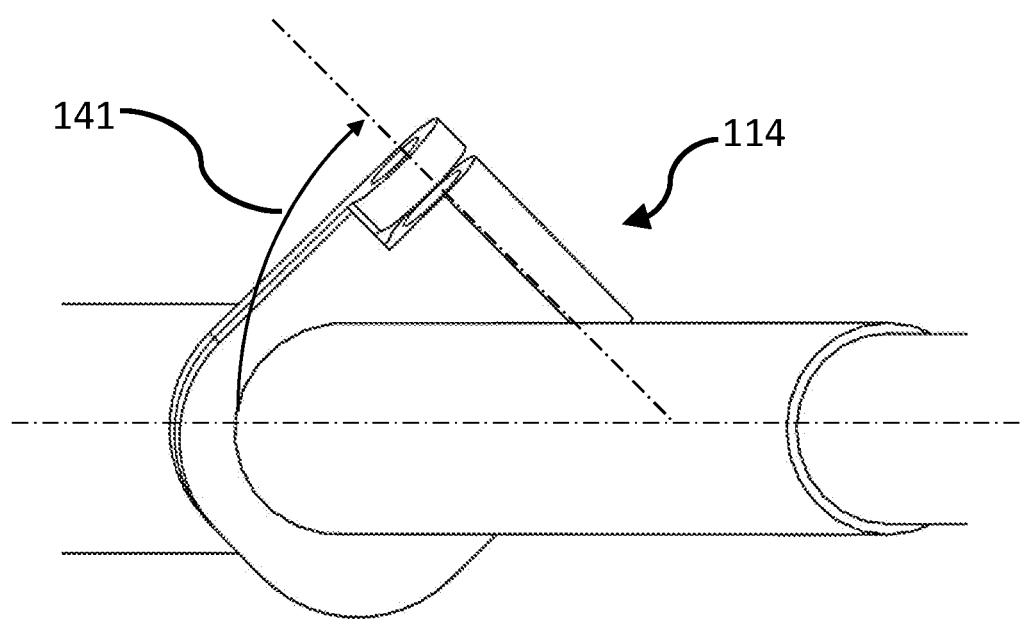
FIG. 16 illustrates a top detail view of the steering hinge of the example bicycle of FIGS. 1-13 and the steering tube pivot axis.
Figure 17:
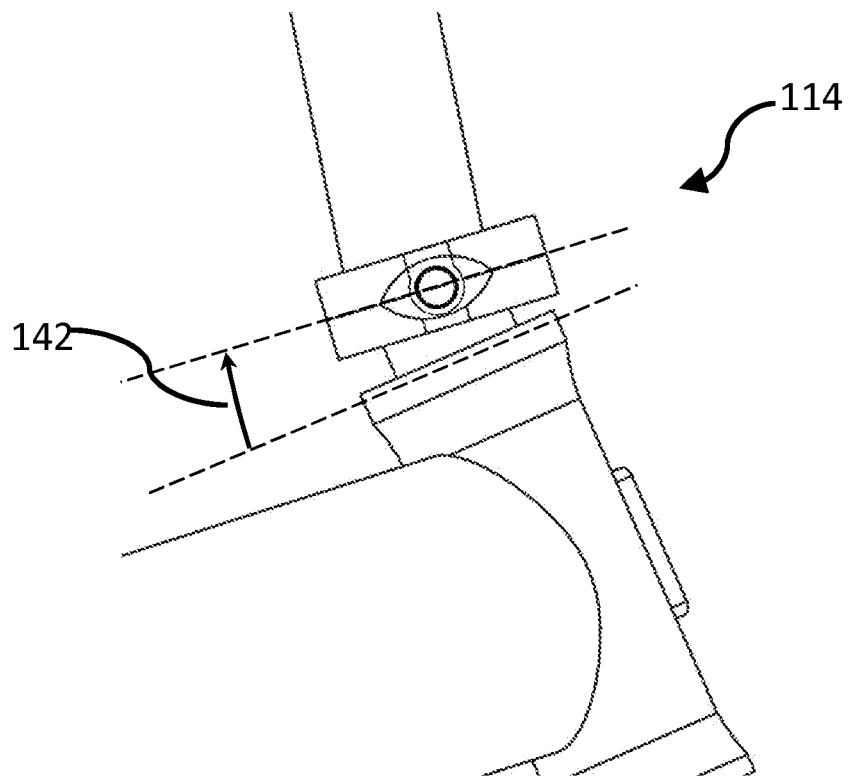
FIG. 17 illustrates a true view of the steering tube pivot axis of the example bicycle of FIGS. 1-13.

Steering tube 113 is further provided with a steering hinge coupling 114 to enable pivoting of the proximal portion of steering tube 113 and handlebar 115 relative to head tube 104 and distal portion of steering tube 113 about a steering tube pivot axis extending at an angle 141 relative to the front vertical longitudinal plane (FIG. 16) and an angle 142 relative to the top face of head tube 104 (FIG. 17). Thus, the steering tube pivot axis extends at an angle relative to a horizontal plane orthogonal to both the rear vertical longitudinal and rear vertical transverse planes.

In some embodiments, angle 141 may be approximately 45 degrees while angle 142 may be approximately 7 degrees. However, greater or lesser angles of inclination of the hinge axis may be appropriate depending on the width dimensions of the various parts of the bicycle and their particular geometry.

Figure 3:
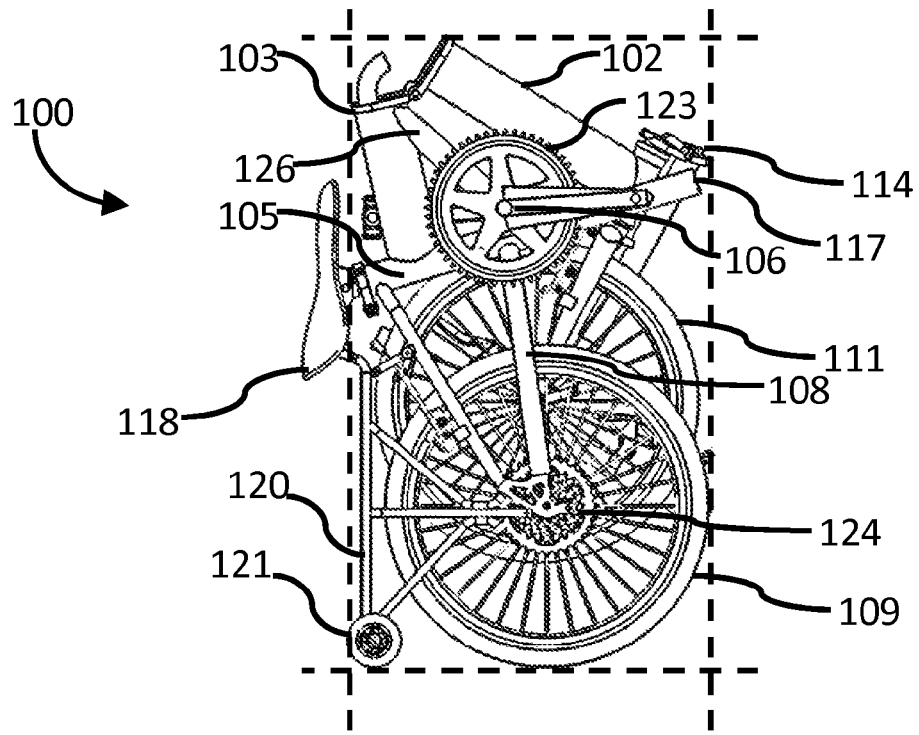
FIG. 3 illustrates a left-side elevation view of the example bicycle of FIGS. 1 & 2 in a folded arrangement and supported in an upright orientation.
Figure 4:
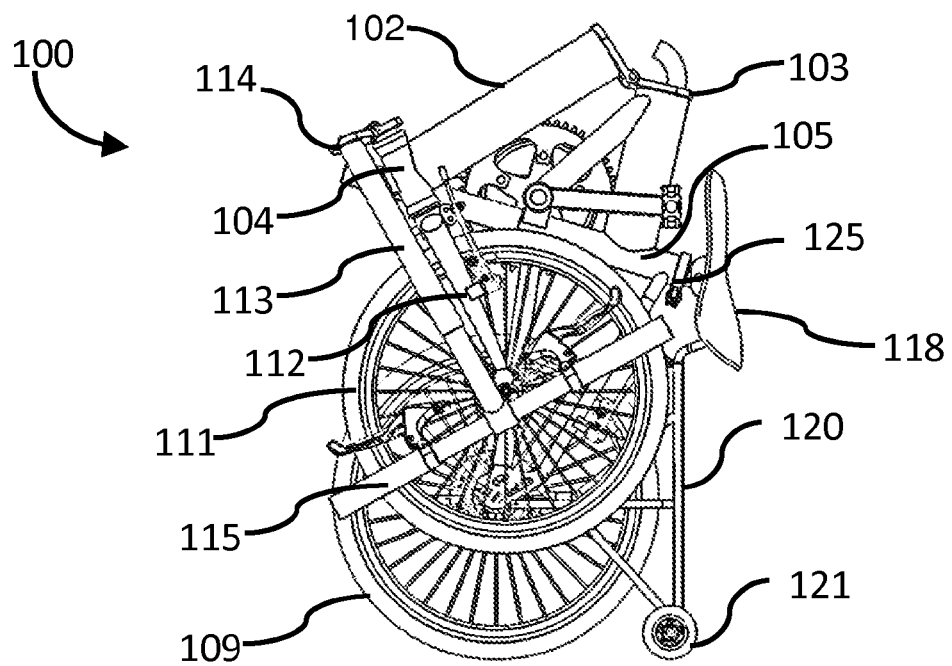
FIG. 4 illustrates a right-side elevation view of the example bicycle of FIGS. 1-3 in a folded arrangement and supported in an upright orientation.
Figure 6:
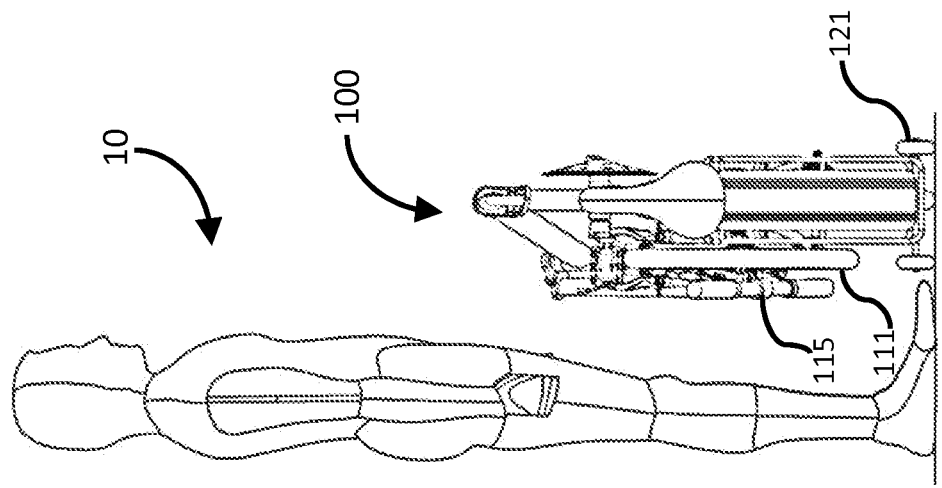
FIG. 6 illustrates a top view of the example bicycle of FIGS. 1-5 in a folded arrangement and supported in an upright orientation next to a user.
Figure 5:
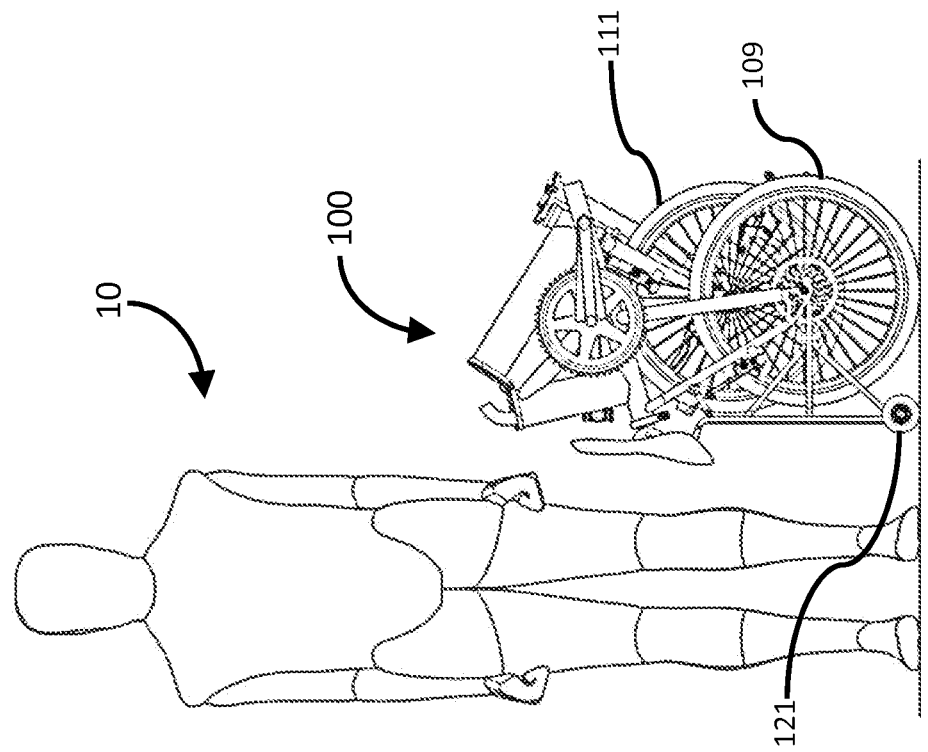
FIG. 5 illustrates a left-side view of the example bicycle of FIGS. 1-4 in a folded arrangement and supported in an upright orientation next to a user 10.
Figure 8:
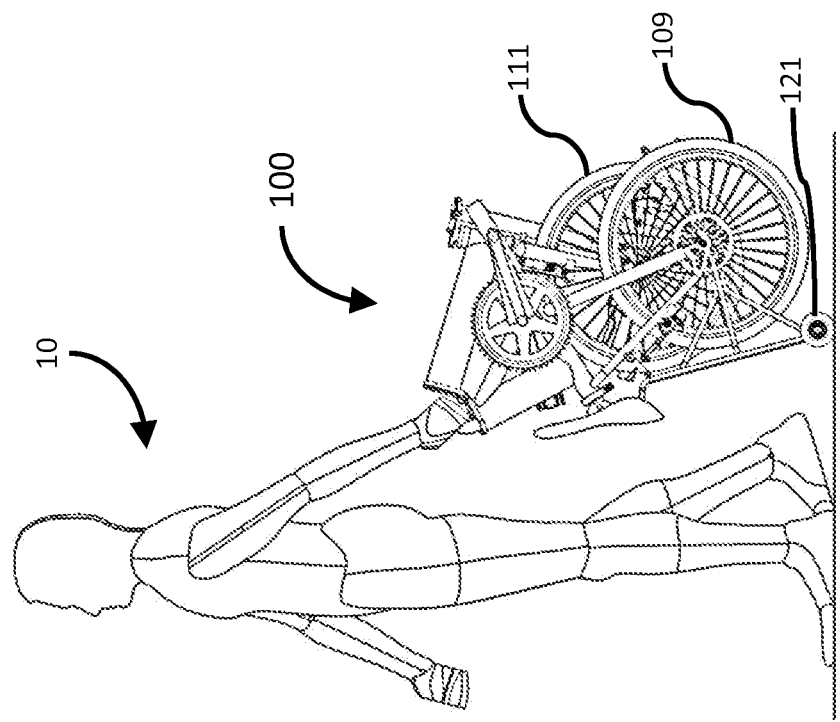
FIG. 8 illustrates a left-side view of a user grasping a portion of the example bicycle of FIGS. 1-7 in a folded arrangement and supported in a rolling orientation.
Figure 7:
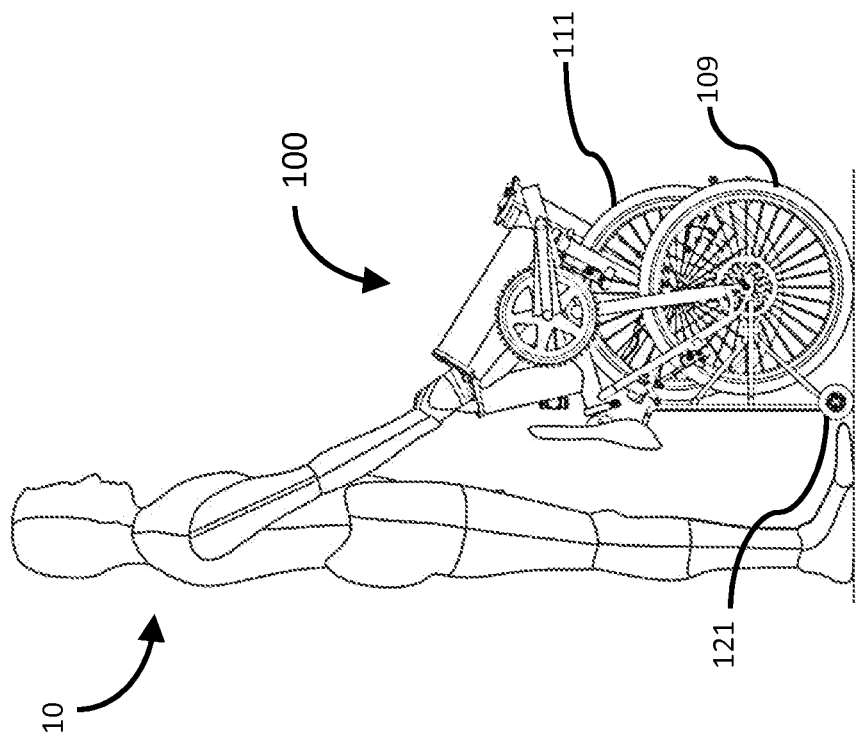
FIG. 7 illustrates a left-side view of a user grasping a portion of the example bicycle of FIGS. 1-6 in a folded arrangement and supported in an upright orientation.
Figure 13:
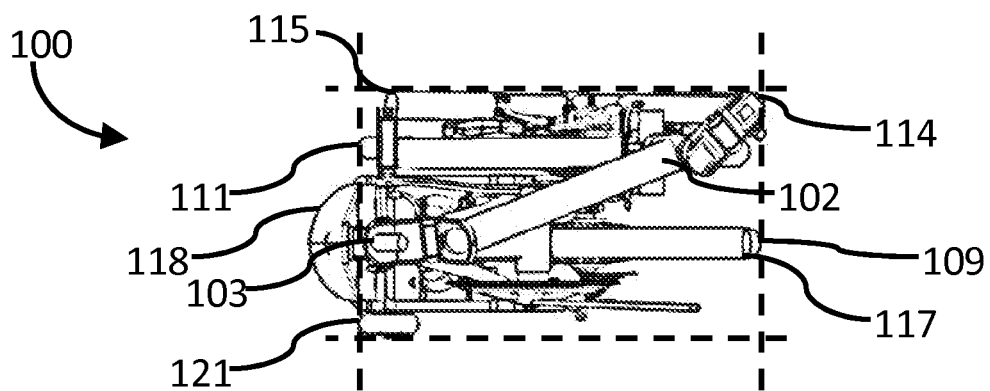
FIG. 13 illustrates a top view of the example bicycle of FIGS. 1-12 in a folded arrangement and supported in an upright orientation.

Complete folding of steering tube 113 positions its proximal portion parallel to and closely spaced from fork 112, while handlebar 115 lies alongside front wheel 111 at an angle of approximately 90 degrees to fork 112 (FIGS. 3, 4 & 13). Furthermore, the folded steering tube 113 and handlebar 115 lie in a plane approximately parallel with the front vertical longitudinal plane of the front wheel 111.

During transition between expanded and folded arrangements, head tube 104 and steering assembly 110 are pivoted about the main frame pivot axis using hinge 103, and steering assembly 110 remains free to rotate relative to head tube 104. Thus, by turning steering tube 113 slightly about the head tube axis, when steering assembly 110 is in the folded arrangement, front wheel 111 may be oriented parallel and spaced-apart from rear wheel carrier 108 so as to partially overlap rear wheel 109 when viewed in profile (FIGS. 3, 4 & 13).

The angular range of travel of the steering assembly 110 between the expanded arrangement and the folded arrangement may also depend on the particular dimensions and geometry of the bicycle.

A locking means may be provided for securing steering tube hinge 114 against pivoting while in the operative, expanded riding arrangement.

A rear rack assembly 119 provided to the rear portion of bicycle 100 includes a rear rack 120 and roller wheels 121. In some embodiments, rear rack assembly 119 may be secured to rear wheel carrier 108 such that rack 120 is disposed slightly above rear wheel 109 in a generally horizontal orientation in the expanded, riding arrangement. The rear end of the rack 120 carries a pair of co-axial roller wheels 121 such that, with bicycle 100 in the folded arrangement and oriented generally upright (FIGS. 3, 4 & 12), rack 120 is primarily vertical in orientation and the folded bicycle may be supported at rear wheel 109 as well as at roller wheels 121. Thus, a plane tangent to the roller wheels 121 and the rear wheel 109 is parallel with the front and rear transverse vertical planes (which are in a horizontal orientation in FIGS. 3, 4 & 12). In this way, bicycle 100 may be supported in an upright orientation (FIGS. 3-8) by means of rear wheel 109 and roller wheels 121 without the need for being leaned against an upright surface or held in place by a user.

Bicycle 100 includes a seat assembly 116 with a seat post 117 configured to hold a seat 118 at a top end. Seat post 117 is slidably engageable within seat tube 105 of frame member 102 and capable of extension or retraction relative thereto thus enabling comfortable positioning for a rider in the expanded arrangement as well as reduced dimensions in the folded arrangement.

Seat post 117 may be selectively secured at any of a variety of positions within seat tube 105 by a fastening mechanism 125. Suitable fastening mechanisms 125 may include but are not limited to clamps such as a quick-release clamp.

Figure 10:
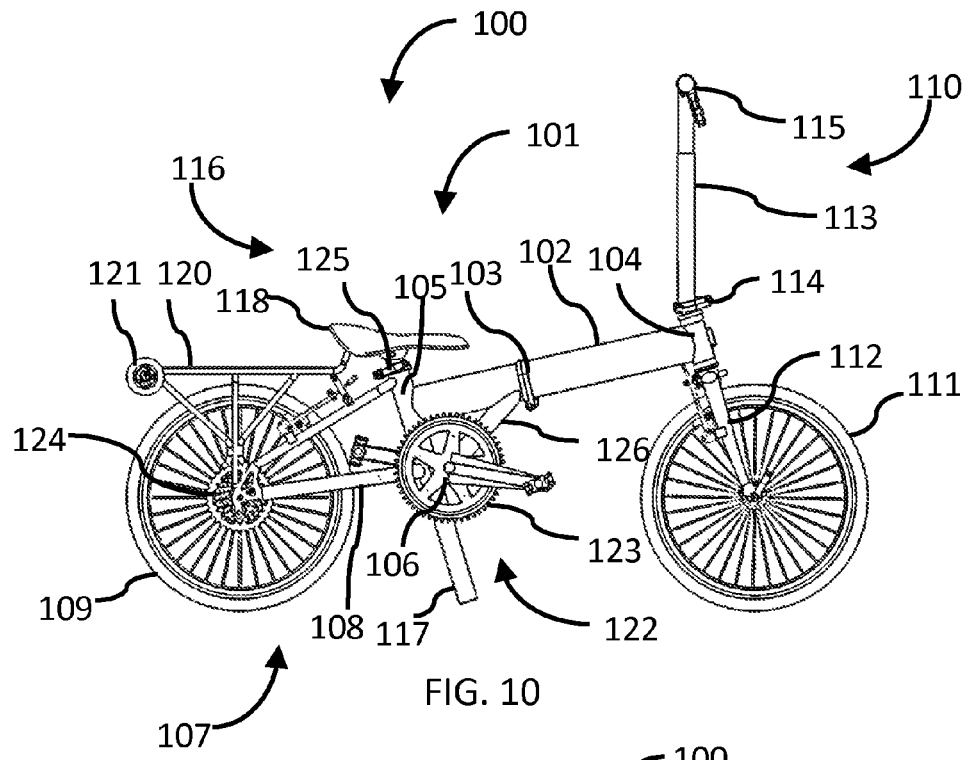
FIG. 10 illustrates a schematic side elevation view of the example bicycle of FIGS. 1-9 with seat post 117 in a retracted position.
Figure 11:
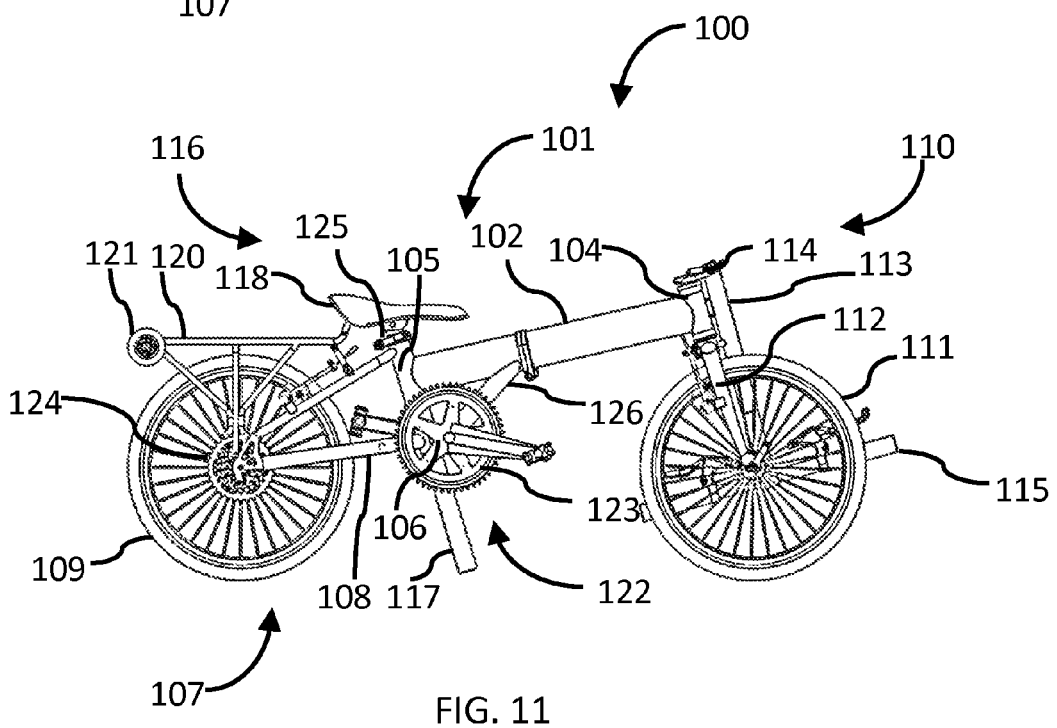
FIG. 11 illustrates schematic side elevation view of the example bicycle of FIGS. 1-10 with seat post 117 in a retracted position and the steering tube 113 and handlebar 115 in the folded arrangement.

With bicycle 100 in the expanded, riding arrangement, seat post 117 is partially inserted into seat tube 105 and secured by fastening mechanism 125. In the fully retracted position seat 118 may be located proximal to the main frame member 102 (FIGS. 10 & 11). In some embodiments, seat post 117 is longer than seat tube 105 such that seat post 117 extends out from the bottom, open end of the seat tube 5 when retracted (FIGS. 10 & 11).

Figure 12:
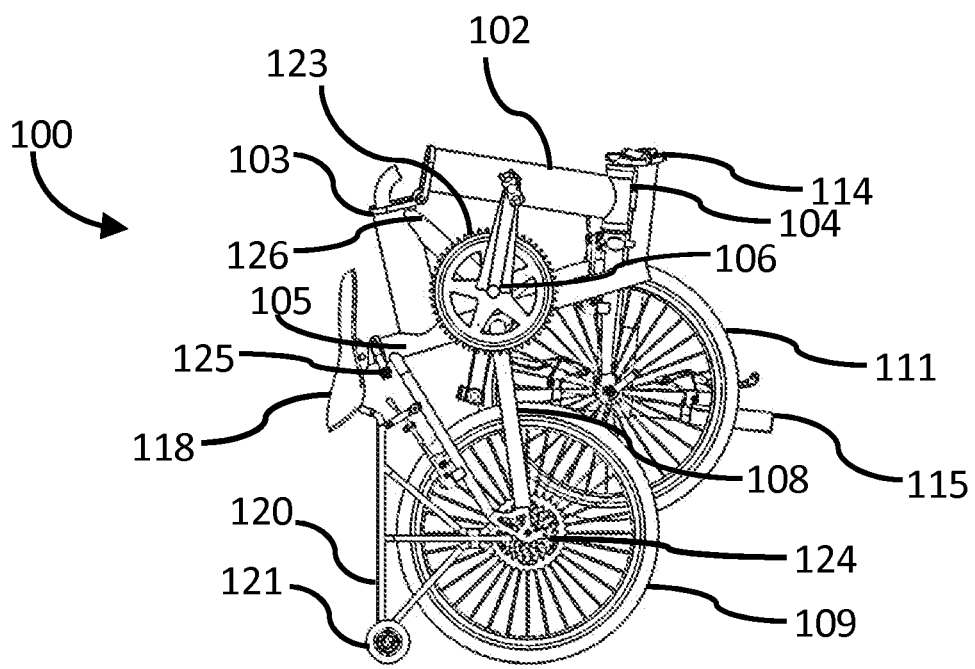
FIG. 12 illustrates a left-side elevation view of the example bicycle of FIGS. 1-11 in a partially folded arrangement and supported in an upright orientation.

With main frame hinge 103 unlocked, applying a force to main frame member 102 near the main frame pivot axis in a direction towards a surface of the main frame member generally opposite the hinge coupling 103 promotes conversion from the expanded arrangement to the folded arrangement (FIG. 12). As such, lifting the main frame member 102 from a supporting surface in a generally vertical direction, will cause steering assembly 110 to begin pivoting substantially downwardly about the hinge 103 with the assistance of gravity.

Generally, when bicycle 100 is in the folded arrangement, the front portion of main frame member 102 extends at an oblique angle with respect to the rear vertical longitudinal plane (FIG. 13); the front vertical longitudinal plane lies between the rear vertical longitudinal plane and the steering tube 113; and the front and rear vertical longitudinal planes are spaced apart and approximately parallel (FIG. 9). Thus, front wheel 111 lies substantially alongside rear wheel carrier 108 and overlaps rear wheel 109 (FIGS. 3 & 4).

As an additional characteristic when bicycle 100 is in the folded arrangement, the front vertical transverse plane is spaced apart from the rear vertical transverse plane such that axes 127 and 128 are offset (FIGS. 3, 4 & 9). By offsetting wheel axes 127 and 128 while keeping the front vertical longitudinal plane parallel to rear vertical longitudinal plane, the front vertical longitudinal plane and the rear vertical longitudinal plane are spaced apart by a distance not greater than the sum of one-half of the length of the front wheel axle and one-half of the length of the rear wheel axle. Thus, front wheel 111 may be positioned close to rear wheel assembly 107 offering a relatively small width dimension in the folded arrangement.

The folded bicycle can be supported in an upright position by the roller wheels 121 of the rear rack assembly 119, and the rear wheel 109. With reference to FIGS. 5-8, when in the folded arrangement, bicycle 100 has a height approximately equal to the position of a dangling hand of the user for which it is configured while the user is standing. As such, user 10 may conveniently grasp a portion of bicycle 100 without ducking, hunching or significant flexion of the knees or hips. The height of the bicycle in the folded arrangement may be, for example, between approximately 0.60 and approximately 0.90 meters. Roller wheels 121 enable rolling of the bicycle in at least upright and declined orientations in a direction parallel with the rear vertical longitudinal plane as illustrated by example in FIGS. 7 & 8.

In some embodiments, a handle or a strap may be provided to facilitate pulling or pushing of the bicycle while in the folded arrangement.

Positions and orientations of the main frame member and steering tube pivot axes enable main frame member 102, steering assembly 110, and transmission assembly 122 to be contained within a right rectangular prism defining a base edge parallel to the rear vertical longitudinal plane and having a length equal to or less than the distance between the most lateral surface of the roller wheels 121 and the most lateral surface of the rear wheel 109 (FIG. 13). In some embodiments, the base edge has a length equal to or less than the distance between the most lateral surface of the hinge coupling 103 and the most lateral surface of the rear wheel 109. In some embodiments, main frame member 102, steering assembly 110 and transmission assembly 122 all lie within a vertical space with a width defined between rear wheel 109 and rack 120.

According to a method for configuring an example vehicle between an expanded arrangement and a folded arrangement, a user may unfasten quick release clamp 125 and retract seat post 117 into seat tube 105 until seat 118 is located proximal to the main frame member 102. Quick release 125 may be refastened to secure seat post 117 in the retracted position (FIGS. 10 & 11). Next, steering tube hinge 114 may be unfastened and handlebar 115 may be folded down to lie alongside the fork 112 and the front wheel 111 (FIG. 11). Steering tube 113 is configured such that the longitudinal axis of its proximal portion lies within a plane parallel to and spaced apart from the front longitudinal plane while its distal portion lies within the vertical longitudinal plane. With steering assembly 110 in the folded arrangement, hinge 114 may be re-secured.

With the steering assembly 110 in the folded arrangement, the frame hinge 103 may be unfastened and elongate main frame member 102 is configured such that longitudinal axes of its forward and rearward portions are non-coincidental such that the longitudinal axis of the forward end extends in an oblique plane while the longitudinal axis of the rearward end extends within the rear vertical longitudinal plane. The user may arrive at this configuration by lifting the front end of the main frame member 102 up and, with the aid of gravity, swing rear wheel 109 downwardly and then forwardly (FIG. 12) by approximately 90 degrees. At the same time, with the aid of gravity, front wheel 111 may be folded downward by approximately 45 degrees until it almost fully overlaps wheel carrier 108 (FIGS. 3 & 4).

Front wheel 111 is configured such that the longitudinal vertical plane lies within a plane approximately parallel to and spaced apart from the rear longitudinal vertical plane and between the rear longitudinal vertical plane and the plane of the steering tube proximal portion. This may be accomplished by slightly rotating front wheel 111.

The bicycle may then be secured in the folded arrangement. The folded bicycle may be parked in an upright position, supported by the rear wheel 109 and the rear rack roller wheels 121. To transport, the folded bicycle may be rolled on the rear rack roller wheels 121 as demonstrated in FIGS. 7 & 8.

Return of the bicycle to the expanded arrangement may achieved by reversing the folding action and re-securing all hinges and fastening devices.

Figure 18:
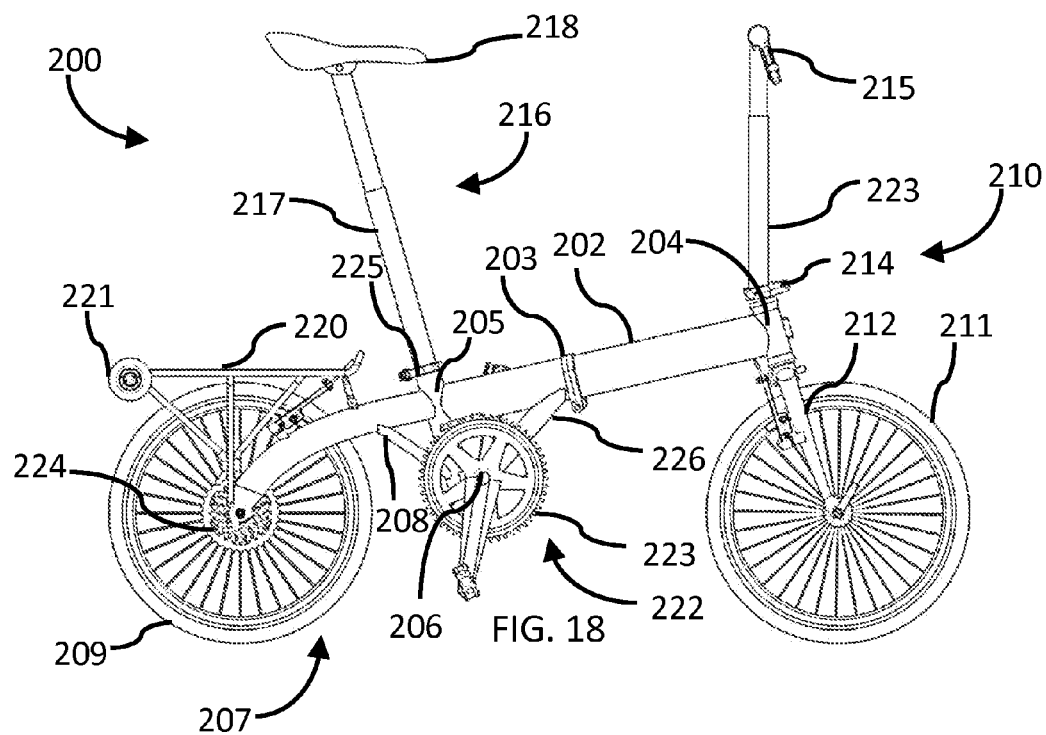
FIG. 18 illustrates a side view of a second example bicycle in accordance with the disclosure.
Figure 19:
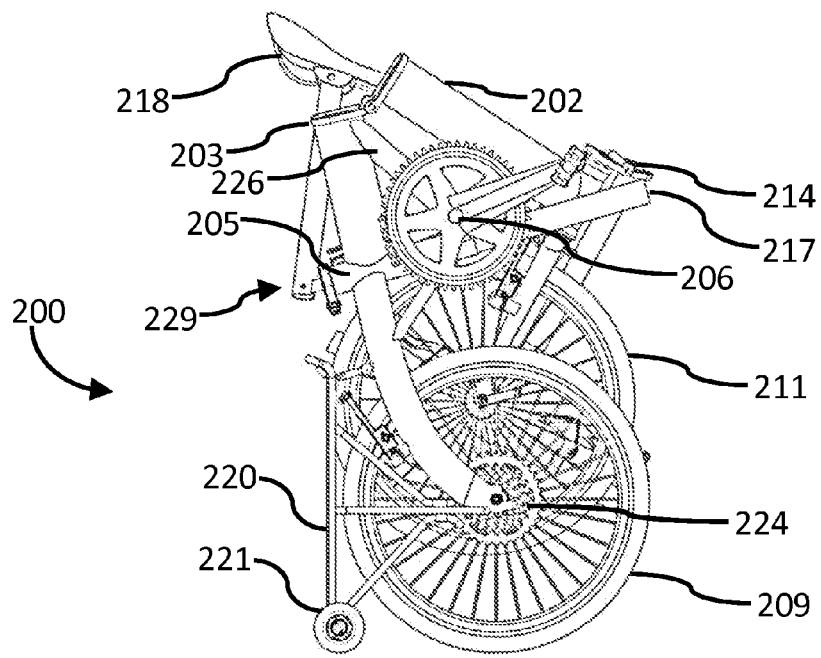
FIG. 19 illustrates a left-side elevation of the example bicycle of FIG. 18 in a folded arrangement and supported in an upright orientation.

According to a second embodiment of foldable bicycle illustrated by way of example in FIGS. 18 & 19, a seat assembly 216 including a folding telescopic seat post 217 may be provided to further reduce the dimensions of the folded bicycle in the folded arrangement (FIG. 19).

It will be appreciated that while generally described within the context of a bicycle, a foldable vehicle in accordance with the disclosure is not limited to a bicycle but may include other vehicles of both non-motorized and motorized varieties including but not limited to unicycles, scooters, tricycles and motorcycles.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A vehicle configured for conversion between expanded and folded arrangements, comprising:
    a front wheel having a circumference defining a front vertical longitudinal plane and an axle defining a front vertical transverse plane orthogonal to the front vertical longitudinal plane;
    a rear wheel having a circumference defining a rear vertical longitudinal plane and an axle defining a rear vertical transverse plane orthogonal to the rear vertical longitudinal plane;
    a main frame member having forward and rearward portions extending between the front wheel and the rear wheel and including, for receiving a steering tube, a head tube formed at a distal end of the forward portion and, for receiving a seat post, a seat tube formed at a distal end of the rearward portion; and
    a hinge coupling enabling relative pivoting of the forward and rearward portions about a main frame pivot axis extending at an acute angle relative to the rear vertical transverse plane and at an acute angle relative to a horizontal plane orthogonal to both the rear vertical longitudinal and rear vertical transverse planes;
    wherein longitudinal axes of the forward and rearward portions are coincident in the expanded arrangement and non-coincident in the folded arrangement; and
    wherein the front vertical longitudinal plane and the rear vertical longitudinal plane are spaced apart and parallel, in the folded arrangement.

2. The vehicle as set forth in claim 1, wherein when the vehicle is in the folded arrangement, the front vertical transverse plane is spaced apart from the rear vertical transverse plane.

3. The vehicle as set forth in claim 1, further comprising a steering tube including a distal portion configured for receipt by the head tube, a proximal portion including a handlebar extending generally perpendicular to the front vertical longitudinal plane and a steering hinge enabling relative pivoting of the proximal and distal portions about a steering tube pivot axis extending at an angle relative to the front vertical longitudinal plane.

4. The vehicle as set forth in claim 3, further comprising a lock configured to secure the steering hinge against pivoting.

5. The vehicle as set forth in claim 3, wherein when the vehicle is in the folded arrangement, the front vertical longitudinal plane lies between the rear vertical longitudinal plane and the steering tube.

6. The vehicle as set forth in claim 3, wherein the steering tube pivot axis extends at an angle of approximately 45 degrees to the front vertical longitudinal plane.

7. The vehicle as set forth in claim 3, wherein the steering tube pivot axis extends at an angle relative to a horizontal plane orthogonal to both the rear vertical longitudinal and rear vertical transverse planes.

8. The vehicle as set forth in claim 7, wherein when the vehicle is in the folded arrangement, the front wheel, rear wheel, main frame member and steering tube are contained within a right rectangular prism defining a base edge parallel to the rear vertical longitudinal and rear vertical transverse planes and having a length equal to the distance between the most lateral surface of the hinge coupling and the most lateral surface of the rear wheel.

9. The vehicle as set forth in claim 1, further comprising co-axial roller wheels configured such that a plane tangent to the roller wheels and the rear wheel is parallel with the front and rear transverse vertical planes.

10. The vehicle as set forth in claim 9, wherein when the vehicle is in the folded arrangement, the front wheel, rear wheel, main frame member and steering tube are contained within a right rectangular prism defining a base edge parallel to the rear vertical longitudinal and rear vertical transverse planes and having a length equal to or less than the distance between the most lateral surface of the roller wheels and the most lateral surface of the rear wheel.

11. The vehicle as set forth in claim 9, wherein, in the folded arrangement, the vehicle is configured such that the roller wheels in combination with the rear wheel are sufficient to support the vehicle in an upright position with the front and rear transverse vertical planes horizontal.

12. The vehicle as set forth in claim 1, wherein when the vehicle is in the folded arrangement, the front vertical longitudinal plane and the rear vertical longitudinal plane are spaced apart by a distance not greater than the sum of one-half of the length of the axle of the front wheel and one-half of the length of the axle of the rear wheel.

13. The vehicle as set forth in claim 1, wherein the main frame pivot axis lies generally below a center of a cross section of the hinge coupling.

14. The vehicle as set forth in claim 13, wherein, applying a force to the main frame member near the main frame pivot axis in a direction towards a surface of the main frame member generally opposite the hinge coupling promotes conversion from the expanded arrangement to the folded arrangement.

15. The vehicle as set forth in claim 13, wherein, with the vehicle upright and in the expanded arrangement, lifting of a rear portion of the main frame allows gravity to promote conversion from the expanded arrangement to the folded arrangement.

16. The vehicle as set forth in claim 1, wherein the seat tube is open at both ends such that a seat post may extend completely therethrough.

17. The vehicle as set forth in claim 1, wherein, in the folded arrangement, the forward portion of the main frame member extends at an oblique angle with respect to the rear vertical longitudinal plane.

18. The vehicle as set forth in claim 1, wherein, in the folded arrangement with the front and rear transverse vertical planes horizontal, the vehicle is configured to be grasped by a standing user without flexion of user knees or hips.

19. The vehicle as set forth in claim 1, wherein, in the folded arrangement, the vehicle is configured to roll in a direction parallel with the rear vertical longitudinal plane.

20. A vehicle configured for conversion between expanded and folded arrangements, comprising:
   a front wheel having a circumference defining a front vertical longitudinal plane and an axle defining a front vertical transverse plane orthogonal to the front vertical longitudinal plane;
   a rear wheel having a circumference defining a rear vertical longitudinal plane and an axle defining a rear vertical transverse plane orthogonal to the rear vertical longitudinal plane;
   a main frame member having forward and rearward portions extending between the front wheel and the rear wheel and including, a steering tube received by a head tube formed at a distal end of the forward portion and, a seat post received by a seat tube formed at a distal end of the rearward portion; and
   a hinge coupling enabling relative pivoting of the forward and rearward portions about a main frame pivot axis extending at an acute angle relative to the rear vertical transverse plane and at an acute angle relative to a horizontal plane orthogonal to both the rear vertical longitudinal and rear vertical transverse planes;
   wherein the forward and rearward portions include longitudinal axes and the longitudinal axes of the forward and rearward portions are coincident in the expanded arrangement and non-coincident in the folded arrangement;
   wherein, when the vehicle is in the folded arrangement, the front vertical longitudinal plane and the rear vertical longitudinal plane are parallel and spaced by a distance not greater than the sum of one-half the length of the axle of the front wheel and one-half the length of the axle of the rear wheel;
   wherein, when the vehicle is in the folded arrangement, the front vertical transverse plane is spaced apart from the rear vertical transverse plane;
   wherein, when the vehicle is in the folded arrangement, the front wheel, rear wheel, main frame member and steering tube are contained within a right rectangular prism defining a base edge parallel to the rear vertical longitudinal and rear vertical transverse planes and having a length equal to the distance between the most lateral surface of the hinge coupling and the most lateral surface of the rear wheel; and
   wherein, in the folded arrangement with the front and rear transverse vertical planes horizontal, the vehicle is configured to be grasped by a standing user without flexion of the user's knees or hips.

21. A vehicle configured for conversion between expanded and folded arrangements, comprising:
   a front wheel having a circumference defining a front vertical longitudinal plane and an axle defining a front vertical transverse plane orthogonal to the front vertical longitudinal plane;
   a rear wheel having a circumference defining a rear vertical longitudinal plane and an axle defining a rear vertical transverse plane orthogonal to the rear vertical longitudinal plane;
   a main frame member having forward and rearward portions extending between the front wheel and the rear wheel and including, for receiving a steering tube, a head tube formed at a distal end of the forward portion and, for receiving a seat post, a seat tube formed at a distal end of the rearward portion;
   a hinge coupling enabling relative pivoting of the forward and rearward portions about a main frame pivot axis extending at an acute angle relative to the rear vertical transverse plane and at an acute angle relative to a horizontal plane orthogonal to both the rear vertical longitudinal and rear vertical transverse planes;
   and
   co-axial roller wheels configured such that a plane tangent to the roller wheels and the rear wheel is parallel with the front and rear transverse vertical planes, wherein when the vehicle is in the folded arrangement, the front wheel, rear wheel, main frame member and steering tube are contained within a right rectangular prism defining a base edge parallel to the rear vertical longitudinal and rear vertical transverse planes and having a length equal to the distance between the most lateral surface of the roller wheels and the most lateral surface of the rear wheel; and
   wherein longitudinal axes of the forward and rearward portions are coincident in the expanded arrangement and non-coincident in the folded arrangement;
   wherein the front vertical longitudinal plane and the rear vertical longitudinal plane are parallel and spaced apart by a distance not greater than the sum of one-half the length of the axle of the front wheel and one-half the length of the axle of the rear wheel, in the folded arrangement; and
   wherein with the vehicle in the folded arrangement and with the front and rear transverse vertical planes horizontal, the vehicle is configured to be grasped by a standing user without flexion of the knees or hips.

* * * * *